Patented Dec. 6, 1938

2,139,343

UNITED STATES PATENT OFFICE 2,139,343

METHOD OF SURFACE TREATING FIBROUS ROPE OR CORDAGE

Robert C. Williams and Hugh M. Bone, Columbus, Ohio, assignors to The Ironsides Company, Columbus, Ohio, a corporation of Ohio No Drawing. Application August 7, 1936, Serial No. 94,831

1 Claim. (Cl. 91—68)

This invention relates to a novel method of treating hemp or vegetable fibers when fabricated into rope and cordage whereby to render these fibers more resistant to wear and the detrimental effects of water. Hitherto, treating or coating compositions for use on rope or cordage have consisted principally of light petroleum oils, such as paraffin oil, either used alone or when compounded with minor percentages of materials such as: animal or vegetable fats (oils), fatty acids, aluminum oleate or stearate and other soaps, waxes and petrolatum, petrolatum having been frequently used alone.

We have found that waxes and wax-like substances when applied as coating compositions to hemp rope and cordage offer superior protection in the matter of minimizing the effects of wear and deterioration through contact with water, and it is therefore an object of the present invention to provide an improved wax-like composition and method of applying the same to fibrous rope or cordage in a more evenly and uniformly distributed and economical manner than heretofore employed. Wax, notably beeswax, has been employed as a coating lubricant for vegetable fibers in threads used in the sewing of leather articles such as shoes, harness and the like but to use similar methods in applying wax to large commercial quantities of newly manufactured rope or cordage would be impracticable, inefficient and unduly expensive. For instance, to attain the maximum effect as a lubricant, any normally solid wax must remain solid after application and when the rope or cordage is in use. In other words, wax dissolved in an oil, or plasticized by an oil to such an extent that it does not have wax-like characteristics, is much less effective as a lubricant. The conventional oleaginous lubricants, such as described above, in no way resemble waxes, and even though they may contain substantial percentages of waxes, their properties do not produce enhanced lubrication as do waxes and wax-like substances alone.

Having observed the unique utility of waxes for the treatment of hemp fibers, it became desirable to apply wax to said fibers in a way which would preserve the original properties of the wax and yet be economically feasible. Volatile solvents might serve though such a method has several attendant disadvantages. Application of the wax in a molten form would require careful manipulation under elevated temperatures to prevent the congealing and unequal distribution of the wax.

We have found, however, that wax, when treated with an emulsifying agent, may be brought into a stable emulsified state with larger quantities of water and readily sprayed on the outer surfaces of hemp rope or cordage so that following the evaporation of the volatiles present in the emulsified treating composition, a uniformly distributed film of wax or wax-like material will remain on the rope or cordage which will produce highly desirable results in resisting deterioration of the fibers so treated.

Coating materials may be produced in the form of a concentrate of which the following is an example:

Example No. 1

|  | Per cent |
|---|---|
| Crude scale wax (M. P. 123°–125° F.) | 40 |
| Stearic acid (double pressed) | 14 |
| Aqua ammonia (26° Bé.) | 3.5 |
| Water | 42.5 |
|  | 100.0 |

This concentrated product is further diluted with water to a desirable fluidity for application by spraying, dipping or otherwise. Three parts of water to one part of the above concentrate is recommended as a desirable strength but more or less water may be used as desired.

After the water and the ammonia have volatilized, there remains on the fibers a water resisting film of wax having excellent lubricating properties. The use of ammonia, or other volatile alkaline agent, with the fatty acid to form the emulsifying agent, is particularly desirable when a water-resisting film is to be deposited. An ammonium soap is thus produced. A very small percentage of copper oleate or other copper compound may be incorporated in the emulsion to protect the rope against certain organisms which are known to cause or promote deterioration.

Other formulations which we have used to treat hemp fibers are as follows:

Example No. 2

|  | Per cent |
|---|---|
| Crude scale wax (M. P. 123° to 125° F.) | 40 |
| Oleic acid | 14 |
| Aqua ammonia (26° Bé.) | 3.5 |
| Water | 42.5 |
|  | 100.0 |

In this example, the liquid oleic acid is not sufficient in quantity to cause the wax to be plasticized so that it loses its wax-like nature.

Example No. 3

| | Per cent |
|---|---|
| Crude scale wax (M. P. 123° to 125° F.) | 20 |
| Amber petrolatum (M. P. 122° F.) | 20 |
| Stearic acid (double pressed) | 14 |
| Aqua ammonia (26° Bé.) | 3.5 |
| Water | 42.5 |
| | 100.0 |

A further advantage to be gained in using a lubricant of the above types is that the resulting film is essentially stainless. When cordage is used for packaging, staining of the package due to the oil associated with a coating composition on twine, for example, is commonly experienced.

Due to the solid waxy nature of the film deposited from emulsions such as described above, staining is highly improbable. Petrolatum alone on a rope is not stainless, but compounded as in Example 3, the same is not objectionable as the wax-like characteristics of the wax and stearic acid are predominant. In Example No. 1, the crude scale wax could be omitted and the stearic acid alone, being somewhat waxy in nature, would suffice. The cost, however, would no doubt be prohibitive for most commercial purposes. In lieu of using crude scale wax, we may employ a refined paraffin wax. However, from a cost standpoint, the crude scale wax is to be preferred and it offers all necessary elements of protection.

Likewise there are numerous blended waxes that could be used containing oils and plasticizing agents and such blended waxes may be desirable in instances where hard brittle waxes like candelilla or carnauba are employed. Cost considerations, however, generally limit the employment of the cheaper waxes such as crude scale or refined paraffin waxes.

As further examples of treating compositions which may be used in carrying out our present invention, quite satisfactory results have been obtained with the following:

Example No. 4

| | Per cent |
|---|---|
| Brown refined wool wax | 10 |
| Aqua ammonia (26° Bé.) | 3 |
| Water | 87 |
| | 100 |

The above proportion was not further diluted with water for application.

Example No. 5

| | Per cent |
|---|---|
| Commercial beeswax | 10 |
| Aqua ammonia (26° Bé.) | 3 |
| Water | 87 |
| | 100 |

No further dilution of this composition with water was made at the time of its application.

In compounding the materials defined in Example No. 1, the wax and stearic acid are heated above the melting point thereof and to this mixture a portion of the water is added without substantially lowering the temperature of the mixture. The ammonia content is then slowly added with agitation until a fairly smooth lumpless paste is produced. The balance of the water is then added slowly while heating is continued or temperature maintained so that the final temperature of the mixture will be above the melting point of the wax. Substantially the same procedure is followed with reference to the remaining examples.

The emulsified mixture may be applied in any suitable way to the rope or cordage to be treated thereby, such as by the use of spray nozzles, immersion baths, or by passing the rope or cordage between rolls saturated with the emulsion.

What is claimed is:

The method of treating hemp rope with a wax coating having the normal lubricating properties of wax which comprises applying an aqueous ammonium fatty acid soap emulsion of said wax to the rope, and then volatilizing the aqueous ammonia content therefrom to leave a wax coating containing an amount of fatty acid insufficient to plasticize and thereby change the original lubricating characteristics of the wax, said emulsion containing fatty acid of the order of 14% and ammonia water of the order of 3½% and such an amount of wax that the residual fatty acid does not plasticize to affect the lubricating qualities of the wax.

ROBERT C. WILLIAMS.
HUGH M. BONE.